US012573820B2

(12) United States Patent
Miao et al.

(10) Patent No.: US 12,573,820 B2
(45) Date of Patent: Mar. 10, 2026

(54) METHOD FOR LAYING CABLE IN PRESSURE PIPELINE WITHOUT STOPPING TRANSMISSION

(71) Applicant: Bestone (Zhejiang) Safety Technology Co., Ltd., Hangzhou (CN)

(72) Inventors: Hong Miao, Hangzhou (CN); Junhuo Hong, Hangzhou (CN); Songshan Ma, Hangzhou (CN); Jiancheng Ding, Hangzhou (CN); Jianping Lu, Hangzhou (CN); Rongrong Dai, Hangzhou (CN); Wentao Miao, Hangzhou (CN); Chenchao Hong, Hangzhou (CN); Wanqi Yu, Hangzhou (CN)

(73) Assignee: BESTONE (ZHEJIANG) SAFETY TECHNOLOGY CO., LTD., Hangzhou (CN)

( * ) Notice: Subject to any disclaimer, the term of this patent is extended or adjusted under 35 U.S.C. 154(b) by 74 days.

(21) Appl. No.: 18/633,035

(22) Filed: Apr. 11, 2024

(65) Prior Publication Data

US 2025/0279635 A1     Sep. 4, 2025

(30) Foreign Application Priority Data

Mar. 1, 2024    (CN) .......................... 202410232172.5

(51) Int. Cl.
| | |
|---|---|
| *H02G 1/08* | (2006.01) |
| *F16L 41/02* | (2006.01) |
| *H02G 9/06* | (2006.01) |

(52) U.S. Cl.
CPC ............... *H02G 1/08* (2013.01); *F16L 41/02* (2013.01); *H02G 9/06* (2013.01)

(58) Field of Classification Search
CPC .. F16L 55/0279; F16L 2101/50; G02B 6/502; G02B 6/50
(Continued)

(56) References Cited

U.S. PATENT DOCUMENTS

| | | | | |
|---|---|---|---|---|
| 920,455 | A | * 5/1909 | Greenan | .................. G02B 6/52 |
| | | | | 340/320 |
| 4,856,937 | A | * 8/1989 | Grocott | .................. G02B 6/502 |
| | | | | 405/183.5 |

(Continued)

FOREIGN PATENT DOCUMENTS

| | | | | |
|---|---|---|---|---|
| EP | 3483492 | A1 * | 5/2019 | ............. G02B 6/502 |
| JP | 2001327023 | A * | 11/2001 | |
| JP | 2001346310 | A * | 12/2001 | |

OTHER PUBLICATIONS

Chinese Office Action for Application No. 202410232172.5 mail date Apr. 10, 2024, 8 pages.

*Primary Examiner* — Angelisa L. Hicks

(57) ABSTRACT

A method of laying a cable in a pressure pipeline without stopping transmission is provided. An upstream bypass and a downstream bypass are respectively arranged on the pipeline, the upstream bypass comprising first and second upstream valves, and the downstream bypass comprising first and second downstream valves. A hollow floating ball is inserted into the pipeline via the upstream bypass and first and second upstream valves, the floating ball containing a stowed section of a traction rope having a tail end attached to the cable. The floating ball is pushed downstream by a fluid pressure difference in the pipeline until it falls into the downstream bypass, whereupon it is removed via the downstream bypass and the first and second downstream valves. The stowed section of the traction rope is pulled out of the floating ball and fully out through the downstream bypass, thereby extending the cable within the pipeline.

13 Claims, 3 Drawing Sheets

(58) Field of Classification Search
    USPC ...................................................... 254/134.4
    See application file for complete search history.

(56)                      References Cited

U.S. PATENT DOCUMENTS

| | | | | |
|---|---|---|---|---|
| 5,503,370 A * | 4/1996 | Newman | .................. | G02B 6/52 |
| | | | | 254/134.3 R |
| 6,536,463 B1 * | 3/2003 | Beals | ........................ | F16L 7/00 |
| | | | | 405/184 |
| 6,976,498 B2 * | 12/2005 | Leppert | ................... | G02B 6/50 |
| | | | | 137/15.13 |
| 2002/0114595 A1 * | 8/2002 | Potash | ................... | H02G 1/086 |
| | | | | 385/100 |
| 2022/0393444 A1 * | 12/2022 | Radichel | ................ | H02G 1/086 |

* cited by examiner

METHOD FOR LAYING CABLE IN PRESSURE PIPELINE WITHOUT STOPPING TRANSMISSION

RELATED APPLICATIONS

This patent application claims the benefit and priority of Chinese Patent Application No. 202410232172.5 filed with the China National Intellectual Property Administration on Mar. 1, 2024, the disclosure of which is incorporated by reference herein in its entirety for all purposes as part of the present application.

FIELD OF THE INVENTION

The present disclosure relates to the technical field of cable laying in pipelines, in particular to a method for laying a cable in a pressure pipeline without stopping transmission without stopping transmission.

BACKGROUND OF THE INVENTION

It is an effective way to detect pipeline leakage, siltation and other problems and prevent pipeline explosion by laying cables into pipelines. The pipelines include existing pressure pipelines for water diversion, water supply, heat supply, gas, petroleum, chemical and other industries. In the existing intelligent ball detection technology applied in oil and gas chemical pipelines, the intelligent ball is driven to move in the pipeline with differential pressure for detection. After pipeline transmission is stopped, all media transported in the pipeline are emptied, then the valve is opened to put the intelligent ball, and then the intelligent ball is pushed from one end of the pipeline to the other end by the air compressor for internal detection. There are many problems in this technology. Firstly, transmission of the pipeline must be stopped before detection. However, transmission stop of the pipeline not only seriously affects the economic benefits of enterprises, but also affects the production and life order. Therefore, pipeline enterprises generally choose to stop transmission for inspection after pipeline problems have occurred, which is remedial. Secondly, the functions of the intelligent ball are limited. Although the intelligent ball is integrated with more and more sensors, such as a camera, a leakage flux sensor, a sound sensor and a pipe shape sensor, the internal detection of the intelligent ball is temporary, and there are some defects such as no long-term real-time distributed detection and inaccurate positioning of fault points. Thirdly, the intelligent ball is complicated to use and difficult to operate. For example, it is necessary to open a valve or open a hole to lay the intelligent ball into the pipeline, it is necessary to drive the intelligent ball with a large air compressor, it is necessary to cooperate with ground instruments, the intelligent ball is easily stuck in the pipeline, and it is difficult to find and take out the ball after it is lost. Fourthly, the cost performance of intelligent ball detection is not high. If the detection period is long, the problems cannot be found in time. If the detection period is short, the cost remains high, which further affects the normal pipeline transportation.

In the field of monitoring and early warning of long-distance high-pressure oil and gas pipelines risks, the distributed fiber sensor cannot be continuously laid along the pipeline without excavation. In fact, the inner cavity of the pipeline is a good channel for laying the distributed fiber sensor. If the distributed fiber sensor that meets the internal environment of long-distance high-pressure oil and gas pipelines can be laid into the pipeline, the above problems can be effectively overcome.

SUMMARY OF THE INVENTION

The purpose of the present disclosure is to provide a method for laying a cable in a pressure pipeline without stopping transmission so as to solve the problem that a distributed fiber sensor is effectively laid in an inner cavity of a pipeline without excavation or punching.

In order to solve the technical problem, the present disclosure adopts the following technical scheme.

The present disclosure provides a method for laying a cable in a pressure pipeline without stopping transmission, including the following steps:

S1, arranging an upstream bypass and a downstream bypass on the pipeline of the cable to be laid between an upstream valve and a downstream valve respectively; wherein a first downstream valve and a second downstream valve are arranged on the downstream bypass, a first upstream valve and a second upstream valve are arranged on the upstream bypass; a pay-off reel and a take-up reel are respectively arranged in the upstream bypass and the downstream bypass, and a floating ball is arranged in the upstream bypass; the floating ball is of a hollow structure, and a traction rope with a length of two meters is stored in the floating ball;

S2, then opening the second upstream valve arranged on the upstream bypass and away from the pipeline, and placing the floating ball movable to the downstream bypass under an action of a fluid pressure difference in the pipeline between the first upstream valve and the second upstream valve, wherein the floating ball is connected with the traction rope, and a tail end of the traction rope is connected with the cable to be laid; the traction rope or the cable is wound on the pay-off reel;

then closing the second upstream valve arranged on the upstream bypass and away from the pipeline, and then opening the first upstream valve arranged on the upstream bypass and close to the pipeline, so that the floating ball enters the pipeline, and as the floating ball moves forward in the pipeline, the cable on the pay-off reel is dragged into the pipeline so as to lay the cable;

S3, enabling the floating ball to move to a position of the downstream bypass under the action of the fluid pressure difference in the pipeline, so that, due to the downstream bypass is located at a bottom of the pipeline, the floating ball falls into the downstream bypass under a weight of the floating ball; then, opening the first downstream valve arranged on the downstream bypass and close to the pipeline, so that the floating ball falls between the first downstream valve and the second downstream valve on the downstream bypass;

then closing the first downstream valve arranged close to the pipeline, simultaneously opening the second downstream valve arranged on the downstream bypass and away from the pipeline, taking out the floating ball, and pulling out the traction rope stored in the floating ball;

enabling the traction rope to pass through a sealing device arranged on the second downstream valve, then pulling traction rope out of the second downstream valve, and closing the second downstream valve on the downstream bypass; pulling all the traction rope out of the downstream bypass until a head of the cable is pulled out of the downstream bypass, so as to complete a whole process of laying the cable into the pipeline.

Where the length of the traction rope is larger than that of the pipeline between the upstream bypass and the downstream bypass.

The upstream bypass and the downstream bypass are arranged on the pipeline of the cable to be laid between an upstream valve and a downstream valve respectively. The fluid flow of the pipeline can be adjusted by the upstream valve of the pipeline, so that the moving speed of the floating ball is controlled and adjusted to prevent the floating ball from passing over the downstream bypass due to excessive fluid pressure difference acting force applied on the floating ball, so as to enable the floating ball smoothly falling into the downstream bypass.

The traction rope can be dragged after the front-end valve is opened to avoid the traction rope from being stuck by the closed valve and being difficult to be wound.

Further, the pipeline is a pressure fluid pipeline.

Further, valves are also respectively arranged at the upstream and downstream ends of the pipeline.

Further, the first downstream valve, a downstream bypass pipe and the second downstream valve are arranged on the downstream bypass in sequence; the first downstream valve is arranged between the downstream bypass and the downstream bypass pipe, and the second downstream valve is arranged at an end of the downstream bypass pipe away from the first downstream valve.

And/or, the take-up reel is arranged in the downstream bypass pipe.

Further, the first upstream valve, an upstream bypass pipe and the second upstream valve are arranged on the upstream bypass in sequence; the first upstream valve is arranged between the upstream bypass and the upstream bypass pipe, and the second upstream valve is arranged at an end of the upstream bypass pipe away from the first upstream valve.

A pay-off reel is installed in the upstream bypass pipe.

Further, the take-up reel is located below the pipeline, and the take-up reel is located above the pipeline, where an outer edge of a gate plate of each of the first upstream valve and the first downstream valve is provided with a rubber ring to prevent from cutting the traction rope when the value is closed, and meanwhile, the tightness of the pipeline is maintained.

Further, the floating ball is a light physical foaming ball.

Further, the traction rope is a high-strength fine thread, and the high-strength fine thread is wound on a bobbin of the pay-off reel.

Further, the floating ball in the shape of a rugby, the largest diameter of the floating ball is a skirt made of silica gel, so that the air tightness is ensured while the passability of the floating ball is ensured.

The floating ball is of a hollow structure, and the traction rope with a length of not less than three meters is stored in the floating ball, so that after the floating ball falls into the downstream bypass and the first downstream valve is closed, the traction rope stored in the floating ball is able to be taken out and a sufficient length of the traction rope is ensured to facilitate pulling the traction rope out of the second downstream valve.

Compared with the prior art, some embodiments have the following beneficial effects. In some embodiments, bypasses are respectively arranged at the upstream and downstream of the pipeline for a cable to be laid, and the floating ball which can move with a fluid in the pipeline to the downstream bypass is placed in the upstream bypass, where the floating ball is connected with a traction rope, the traction rope is connected with the cable to be laid, and the cable can be laid continuously and effectively by using the traction rope.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present disclosure is further described below in combination with the attached figures.

Figure 1:
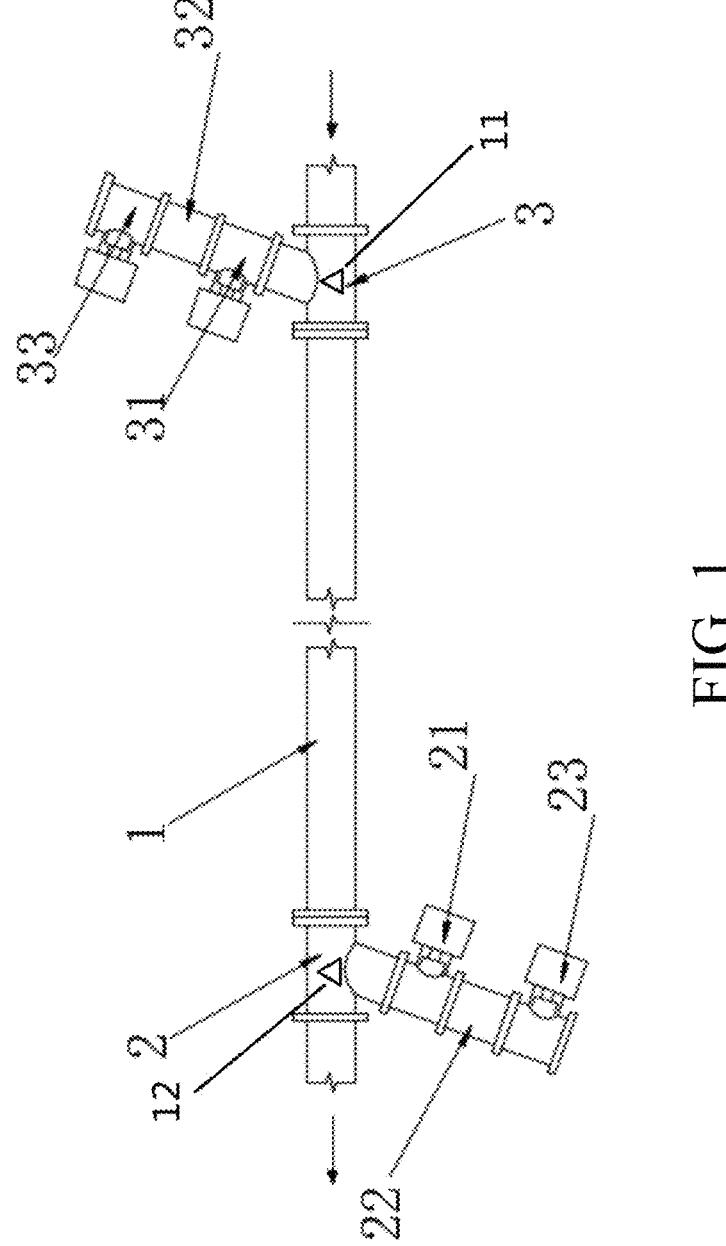
FIG. 1 is a schematic diagram of structural design where a cable laid in a high-pressure pressure pipeline in the present disclosure.

REFERENCE SIGNS IN ATTACHED FIGURES 1 pipeline;
11 an upstream valve;
12 a downstream valve;
2 downstream bypass;
21 first downstream valve;
22 downstream bypass pipe;
23 second downstream valve;
3 upstream bypass;
31 first upstream valve;
32 upstream bypass pipe;
33 second upstream valve;
4 pay-off reel;
41 traction rope;
5 floating ball;
51 traction path; and
6 take-up reel.

DETAILED DESCRIPTION

Embodiment I

A method for laying a cable in a pressure pipeline without stopping transmission is disclosed in the embodiment, including the following steps:

S1, arranging an upstream bypass 3 and a downstream bypass 2 on the pipeline 1 of the cable to be laid between an upstream valve and a downstream valve respectively, where a first downstream valve 21 and a second downstream valve 23 are arranged on the downstream bypass 2, a first upstream valve 31 and a second upstream valve 33 are arranged on the upstream bypass 3;

the first downstream valve 21, a downstream bypass pipe 22 and the second downstream valve 23 are installed on the downstream bypass 2 in sequence; the first upstream valve 31, an upstream bypass pipe 32 and the second upstream valve 33 are installed on the upstream bypass 3 in sequence; a pay-off reel and a take-up reel are respectively arranged in the upstream bypass 3 and the downstream bypass 2, and a floating ball is arranged in the upstream bypass 3; the floating ball is of a hollow structure, and a traction rope with a length of two meters is stored in the floating ball;

S2, then opening the second upstream valve 33 arranged on the upstream bypass 3 and away from the pipeline 1, and placing the floating ball 5 movable to the downstream bypass 2 under the action of a fluid pressure difference in the pipeline 1 between the first upstream valve 31 and the second upstream valve 33, the floating ball 5 is connected with the traction rope 41, and a tail end of the traction rope 41 is connected with the cable to be laid; the traction rope 41 or the cable is wound on the pay-off reel;

then closing the second upstream valve 33 arranged on the upstream bypass 3 and away from the pipeline 1, and then opening the first upstream valve 31 arranged on the upstream bypass 3 and close to the pipeline 1, so that the floating ball 5 enters the pipeline 1, and as the floating ball 5 moves forward in the pipeline 1, the cable on the pay-off reel is dragged into the pipeline 1 so as to lay the cable;

S3, enabling the floating ball 5 to move to the position of the downstream bypass 2 under the action of fluid pressure difference in the pipeline 1, so that, due to the downstream bypass 2 being located at a bottom of the pipeline 1, the floating ball 5 falls into the downstream bypass 2 under a weight of the first upstream valve 5;

then, opening the first downstream valve 21 arranged on the downstream bypass 2 and close to the pipeline 1, so that the floating ball 5 falls between the first downstream valve 21 and the second downstream valve 23 on the downstream bypass 2;

then closing the first downstream valve 21 arranged close to the pipeline 1, simultaneously opening the second downstream valve 23 arranged on the downstream bypass 2 and away from the pipeline 1, taking out the floating ball 5, and pulling the traction rope 41 connected with the floating ball 5 out of the first downstream valve 21, where when the traction rope 41 is dragged, the cable connected with the traction rope 41 has been laid in the pipeline;

finally untying the traction rope 41 from the floating ball 5, pulling the traction rope 41 out of the second downstream valve 23 through the sealing device, and then closing the second downstream valve 23 arranged on the downstream bypass 2;

where the length of the traction rope 41 is larger than that of the pipeline between the upstream bypass 3 and the downstream bypass 2; when the traction rope 41 is completely pulled out of the pipeline, the cable at the tail end of the traction rope 41 are regarded to be completely pulled into the pipeline.

In the embodiment, the upstream bypass 3 and the downstream bypass 2 are arranged on the pipeline 1 of the cable to be laid between an upstream valve and a downstream valve respectively; the fluid flow of the pipeline 1 can be adjusted by the upstream valve of the pipeline 1, so that the moving speed of the floating ball 5 is controlled and adjusted to prevent the floating ball 5 from passing over the downstream bypass 2 due to excessive fluid pressure difference acting force applied on the floating ball 5, so as to enable the floating ball 5 smoothly falling into the downstream bypass 2.

The sealing device specifically relates to a valve structure for a cable built in a gas pipeline, and belongs to the prior art with patent publication (notification) number CN218818563U.

Specifically, in S2, firstly, the upstream valve of the pipeline 1 is closed, the second upstream valve 33 on the upstream bypass 3 is opened to put in the floating ball 5, the traction rope 41 is introduced into the upstream bypass 3 through the sealing device to connect with the floating ball 4, and two meters (larger than the distance between an outlet of the downstream bypass 2 and an inlet of the upstream bypass 3) is stored in the floating ball 4, the second upstream valve 33 of the upstream bypass 3 is closed, then the first upstream valve 31 on the upstream bypass 3 is opened, the floating ball falls into the pipeline 1 by gravity, and then the upstream valve of the pipeline 1 is opened, and the floating ball 5 is brought to the downstream valve of the pipeline by air pressure, and the first downstream valve 21 of the downstream bypass 2 is opened, so that the floating ball 5 falls into the downstream bypass 2.

During the specific implementation, the traction rope with a length of more than 2 meters is stored on the floating ball 5 to ensure that the length of the traction rope in the floating ball can be expanded after the first downstream valve of the downstream bypass is closed to lock the traction rope, and it is ensured that the traction rope can be pulled outside the second downstream valve.

In the embodiment, the pipeline 1 is a liquid or gas pipeline, such as one of a water pipe, an oil pipe and a natural gas pipe.

Valves are also respectively installed at the upstream and downstream ends of the pipeline 1 for controlling the flow rate of a fluid in the pipeline 1.

In the embodiment, the first downstream valve 21, the downstream bypass pipe 22 and the second downstream valve 23 are installed on the downstream bypass 2 in sequence. The first downstream valve 21 is arranged between the downstream bypass 2 and the downstream bypass pipe 22, and the second downstream valve 23 is arranged at the end of the downstream bypass pipe 22 away from the first downstream valve 21.

Specifically, a take-up reel 6 is installed in the downstream bypass pipe 22 and used for taking up the traction rope 41.

In the embodiment, the first upstream valve 31, the upstream bypass pipe 32 and the second upstream valve 33 are arranged on the upstream bypass 3 in sequence. The first upstream valve 31 is installed between the upstream bypass 3 and the upstream bypass pipe 32, and the second upstream valve 33 is arranged at the end of the upstream bypass pipe 32 away from the first upstream valve 31.

Where, a pay-off reel 4 is installed in the upstream bypass pipe 32 for winding the cable to be laid on the pay-off reel 4. When one end of the floating ball 5 reaches the downstream bypass 2, the cable to be laid is moved to the downstream bypass 2 along with the traction rope connected with the floating ball 5.

Specifically, the floating ball 5 is a light physical foaming ball. The traction rope 41 is a high-strength fine thread, and the high-strength fine thread is wound on a bobbin of the pay-off reel.

In the embodiment, the floating ball 5 is in the shape of an elongated prolate spheroid, being similar in shape to a rugby ball as is used in the team sport of rugby football, a portion of the largest diameter of the floating ball is a skirt made of silica gel, and the air tightness is ensured while the passability of the floating ball 5 is ensured.

The floating ball is of a hollow structure, and a traction rope with a length of not less than three meters is stored in the floating ball, so that after the floating ball 5 falls into the downstream bypass 2 and the first downstream valve is closed, the traction rope stored in the floating ball can be taken out and sufficient length of the traction rope is ensured to facilitate pulling the traction rope out of the second downstream valve.

The method includes the following specific working steps in the embodiment.

Figure 2:
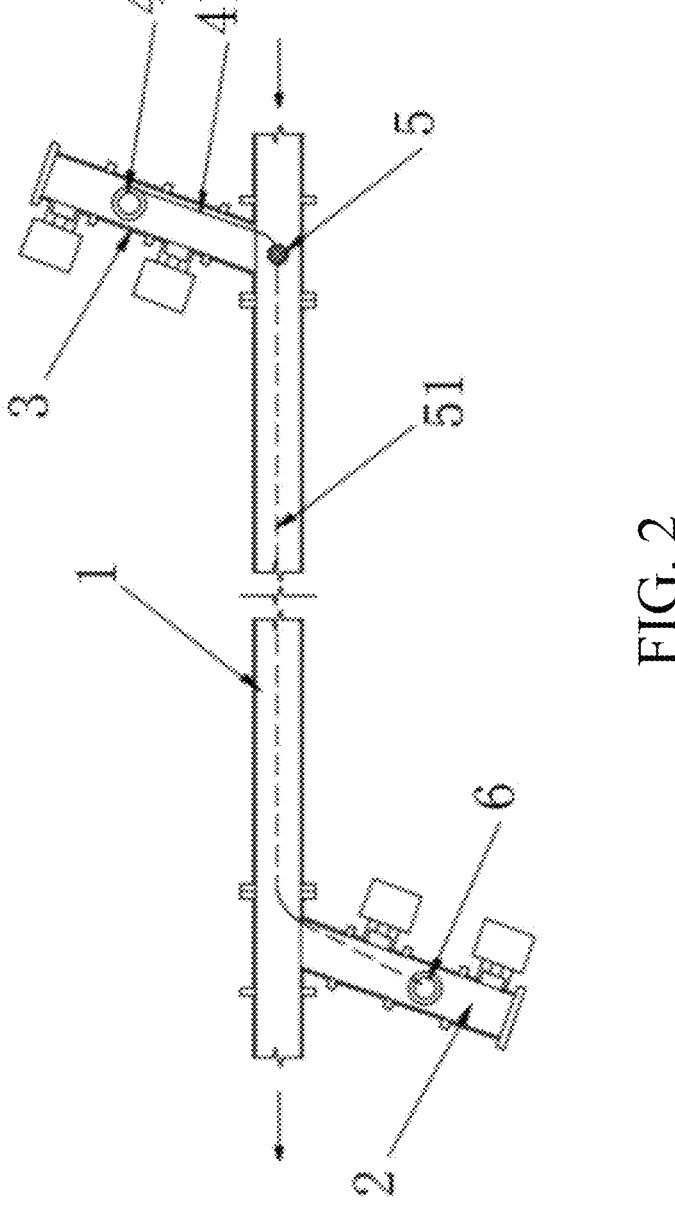
FIG. 2 is a cross-section schematic diagram of FIG. 1.

As shown in FIG. 2, holes are formed between and close to the upstream and downstream valves of the pipeline 1, and bypasses (the upstream bypass 3 and the downstream bypass 2) are installed at the holes respectively. The upstream bypass 3 is higher than an upper wall of the pipeline 1, and the downstream bypass 2 is located below the pipeline 1 and lower than a lower wall of the pipeline 1. Two valves are installed on each bypass pipe in sequence.

The second upstream valve 33 on the upstream bypass 3 is opened, the light physical foaming ball 5 is loaded, and the bobbin coiled with the high-strength fine thread is installed. After the threaded is connected with the light physical foaming ball, the second upstream valve 33 at the rear part of the bypass pipe is closed, the first upstream valve 31 in front of the bypass pipe is opened, and the light physical foaming ball 5 slides into the pipeline 1 with the action of gravity.

The valve of the pipeline 1 is opened, and the light physical foaming ball 5 is pushed downstream by strong thrust of the fluid in pipeline 1, and the traction rope 41 is brought downstream.

When the light physical foaming ball 5 reaches the downstream valve of the pipeline, the first valve (the first downstream valve 21) on the downstream bypass 2 is opened, and the light physical foaming ball 5 slides out of the pipeline (the downstream bypass pipe) and enters the bypass pipe.

The first valve of the downstream bypass 2 (the first downstream valve 21) is closed, the light physical foaming ball 5 is taken back, and the traction rope 41 is lead out of the bypass pipe through a moving sealing ring of the second valve (the second downstream valve 23).

In the embodiment, a high-strength fiber bundle which is not easy to be broken by valves is used as the traction rope, and rubber rings are respectively added on the outer edges of gate plates of valves (the first upstream valve 31 and the second downstream valve 21), so that the traction ropes cannot be broken when the valves are closed.

The traction rope 41 leading out of the upstream bypass pipe is connected with a distributed fiber sensor, and the first upstream valve 31 is opened to facilitate the fiber sensor to enter the pipeline 1.

The traction rope 41 leading out of the downstream bypass pipe is connected with a thread drawer, a take-up machine installed in the downstream bypass pipe 22 is started to pull the distributed fiber sensor to the downstream bypass pipe and out of the downstream bypass pipe. In the specific embodiment, the take-up machine can also be installed outside the downstream bypass pipe.

Where, the distributed fiber sensor and the front and back gate valves on the bypass pipes are fixed, the valves are sealed, and cable laying is completed.

In the specific embodiment, the traction rope and the cable pass through a dynamic sealing device on the second upstream valve on the upstream bypass. Then, the second upstream valve of the upstream bypass is closed, the first upstream valve is opened so that the floating ball enters the main pipeline, then the upstream and downstream valves of the main pipelines are opened so that the pressure difference in the pipeline pushes the floating ball to reach the downstream bypass and fall into the downstream bypass pipe, the second downstream valve is opened after the first downstream valve of the downstream bypass is closed, the floating ball is taken out, the traction rope stored in the floating ball is untied and pass through the dynamic sealing device on the second downstream valve, then the second downstream valve is closed, the first downstream valve is opened, and the traction rope is pulled out of the pipeline through the take-up machine. Meanwhile the cable connected to a tail end of the traction rope is pulled into the pipeline and the head of the cable is pulled out of the pipeline. Finally, the valves on the upstream and downstream bypasses are closed as required.

Embodiment II

Figure 3:
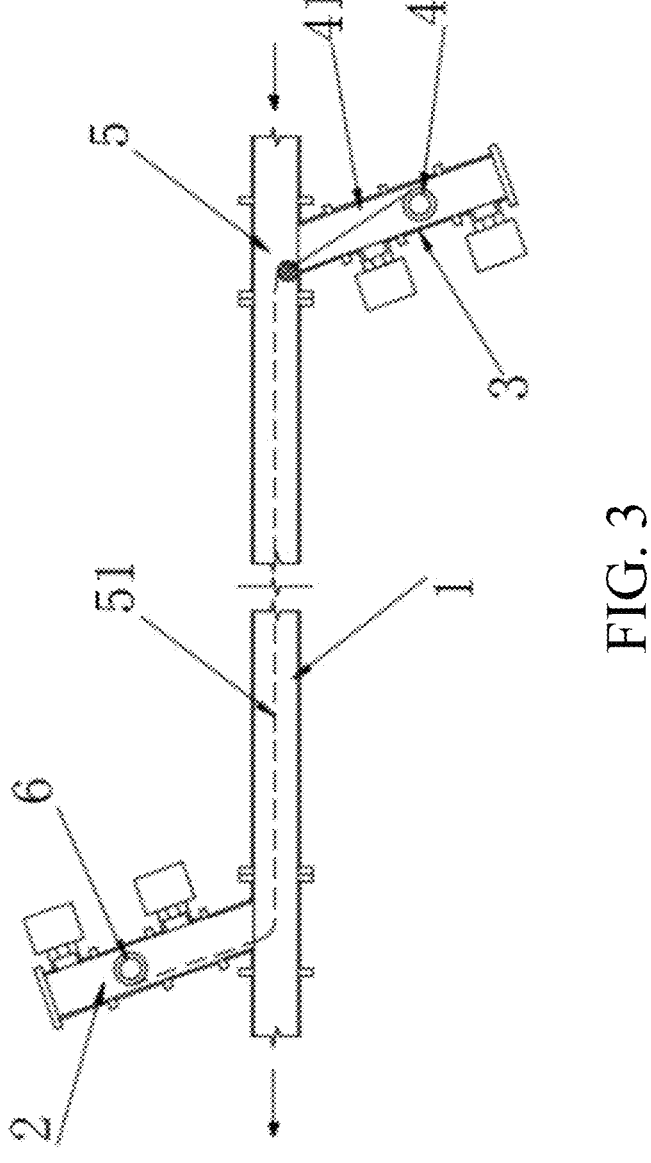
FIG. 3 is a cross-section schematic diagram of FIG. 1 in another embodiment.

In the embodiment, as shown in FIG. 3, when the pipeline 1 is filled with liquid, the pay-off reel 4 is designed to be located below the pipeline 1, and the take-up reel 6 is located above the pipeline 1, so that the floating ball 5 is captured at the downstream bypass 2.

The embodiments described above only describe the preferred manner of the present disclosure and do not limit the scope of the present disclosure, and various modifications and improvements made to the technical solution of the present disclosure by those skilled in the art will fall within the scope of protection as determined by the claims of the present disclosure without departing from the spirit of the design of the present disclosure.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A method of laying a cable in a pipeline without stopping transmission of a medium through the pipeline, the method comprising:

arranging an upstream bypass at an upstream valve on the pipeline and a downstream bypass at a downstream valve on the pipeline, wherein a first downstream bypass valve and a second downstream bypass valve are arranged on the downstream bypass, and a first upstream bypass valve and a second upstream bypass valve are arranged on the upstream bypass, the first upstream and downstream bypass valves being located closer to the pipeline than the corresponding second upstream and downstream bypass valves, the downstream bypass being located at a bottom of the pipeline; wherein the upstream valve is located at a junction of the upstream bypass and the pipeline, and the down-stream valve is located at a junction of the downstream bypass and the pipeline;

arranging a pay-off reel in the upstream bypass and a take-up reel in the downstream bypass;

arranging a floating ball in the upstream bypass, wherein the floating ball is hollow, a stowed section of a traction rope having a length of two meters being stored within and connected to the floating ball;

opening the second upstream bypass valve and placing the floating ball in the upstream bypass, a tail end of the traction rope being connected with the cable, the traction rope and the cable being wound on the pay-off reel;

closing the second upstream bypass valve, and then opening the first upstream bypass valve, so that the floating ball enters the pipeline and moves forward in the pipeline under an action of a fluid pressure difference of the medium in the pipeline, thereby dragging the traction rope and/or cable from the pay-off reel into the pipeline, and extending the traction rope and/or the cable within the pipeline;

enabling the floating ball to move to a position of the downstream bypass under the action of the fluid pressure difference in the pipeline, such that, because the downstream bypass is located at a bottom of the pipeline, the floating ball falls into the downstream bypass under a weight of the floating ball;

opening the first downstream bypass valve, so that the floating ball falls to a location between the first downstream bypass valve and the second downstream bypass valve;

closing the first downstream bypass valve and opening the second downstream bypass valve;

taking out the floating ball from the downstream bypass, and pulling out the stowed section of the traction rope stored in the floating ball;

enabling the traction rope to pass through a sealing device arranged on the second downstream bypass valve, then pulling a portion of the traction rope out of the second downstream bypass valve and closing the second downstream bypass valve; and pulling all the traction rope out of the downstream bypass until a head of the cable is pulled out of the downstream bypass, thereby completing a whole process of laying the cable into the pipeline.

2. The method of claim 1, wherein the pipeline is a pressure fluid pipeline.

3. The method of claim 1, wherein an upstream main valves and a downstream main valve are also respectively arranged at upstream and downstream ends of the pipeline, wherein the upstream main valve is located on the pipeline far away from the upstream bypass, and the downstream main valve is located on the pipeline far away from the downstream bypass.

4. The method of claim 1, wherein the first downstream bypass valve, a downstream bypass pipe and the second downstream bypass valve are arranged on the downstream bypass in sequence, the first downstream bypass valve being arranged between the pipeline and the downstream bypass pipe, while the downstream bypass pipe is arranged between the first and second downstream bypass valves.

5. The method of claim 4, wherein the take-up reel is arranged in the downstream bypass pipe.

6. The method of claim 1, wherein the first upstream bypass valve, an upstream bypass pipe and the second upstream bypass valve are arranged on the upstream bypass in sequence, the first upstream bypass valve being arranged between the pipeline and the upstream bypass pipe, while the upstream bypass pipe is arranged between the first and second upstream bypass valves.

7. The method of claim 6, wherein the pay-off reel is installed in the upstream bypass pipe.

8. The method of claim 1, wherein the take-up reel is located below the pipeline; and the pay-off reel is located above the pipeline.

9. The method of claim 1, wherein for each of the first upstream bypass valve and the first downstream bypass valve an outer edge of a gate plate thereof is provided with a rubber ring.

10. The method of claim 1, wherein the floating ball is a light physical foaming ball.

11. The method of claim 1, wherein the traction rope is a high-strength fine thread rope, the high-strength fine thread being in a filament shape, and the high-strength fine thread being wound on a bobbin of the pay-off reel.

12. The method of claim 1, wherein the floating ball is in a shape of an elongated prolate spheroid, a portion of a largest diameter of the floating ball being a skirt made of silica gel, so that an air tightness is ensured while movement of the floating ball through the pipeline is ensured.

13. The method of claim 1, wherein a length of the stowed section of the traction rope is not less than three meters, so that after the floating ball falls into the downstream bypass, the first downstream bypass valve is closed, and the stowed section of the traction rope is pulled out of the floating ball, a sufficient length of the traction rope is provided to facilitate pulling all of the traction rope out of the second downstream bypass valve.

* * * * *